United States Patent [19]

Williamson

[11] 4,309,567
[45] Jan. 5, 1982

[54] FURNACE FOREHEARTH ELECTRODE GROUPS HAVING LESS THAN 90° PHASE DIFFERENCE BETWEEN ADJACENT GROUPS

[75] Inventor: Michael Williamson, Newark, Ohio

[73] Assignee: Owens-Corning Fiberglas Corporation, Toledo, Ohio

[21] Appl. No.: 19,389

[22] Filed: Mar. 12, 1979

[51] Int. Cl.³ .............................................. C03B 5/02
[52] U.S. Cl. ......................................................... 13/6
[58] Field of Search .................... 13/6, 23, 24; 65/136

[56] References Cited

U.S. PATENT DOCUMENTS 3,967,046 6/1976 Froberg et al. ............................ 13/6
3,985,944 10/1976 Maddux ...................................... 13/6
4,029,488 6/1977 Rhett ...................................... 65/136

Primary Examiner—Roy N. Envall, Jr.
Attorney, Agent, or Firm—Ronald C. Hudgens; Patrick P. Pacella

[57] ABSTRACT

A forehearth in a melting furnace is arranged with groups of electrodes and with each group having at least a pair of opposed electrodes. The opposed electrodes are connected to a multiphase power source so that the phase relationship between groups of adjacent electrodes along the forehearth is 90° or less and typically 60°. The electrode groups may be arranged along the path of molten material movement in the forehearth and may be arranged to generate and produce a current across the forehearth. The electrodes may be arranged to enter from the bottom, side or top of the forehearth channel.

11 Claims, 3 Drawing Figures

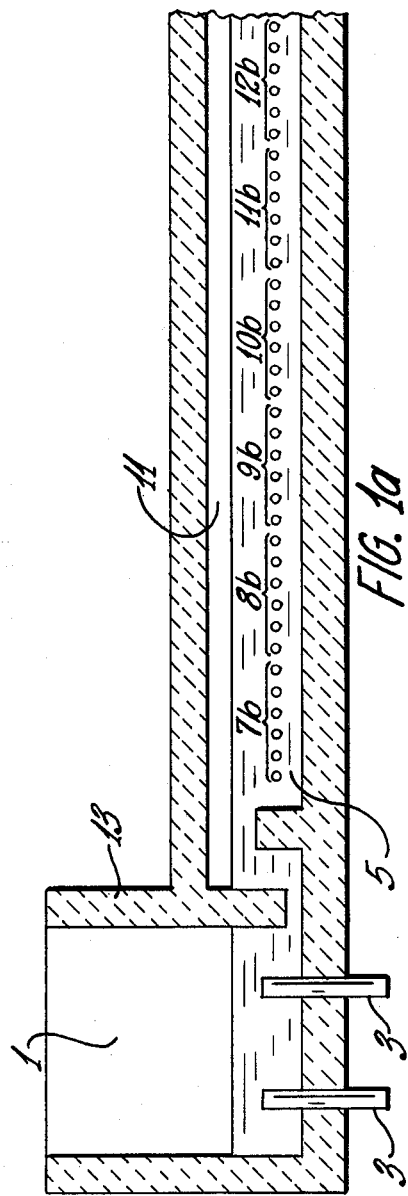
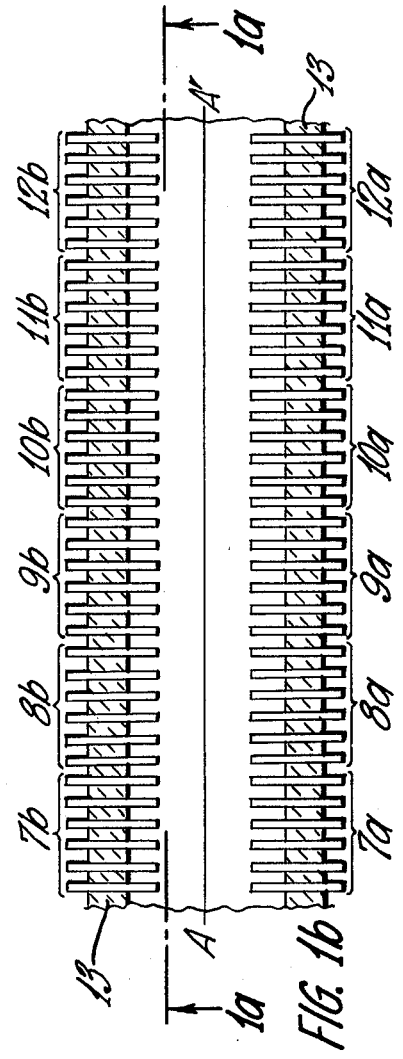

FURNACE FOREHEARTH ELECTRODE GROUPS HAVING LESS THAN 90° PHASE DIFFERENCE BETWEEN ADJACENT GROUPS

BACKGROUND OF THE INVENTION

This invention relates to melting furnaces and particularly to a forehearth in a glass melting furnace.

In such a furnace, the heat within the furnace and within the forehearth is produced by Joule effect heating. Electrodes placed in the forehearth are energized by a source of AC power and a current flows through the electrodes and through the melted material between the electrodes.

A common problem within the forehearth is to produce heating while minimizing extraneous cross firing and undesirable current paths between separate groups of opposed electrodes. These separate groups of opposed electrodes are each connected to separate phase combinations of a multiphase power supply or to separate power supplies and are arranged to produce a current through the molten material in the forehearth and to heat the molten material by Joule effect heating. It is of maximum advantage to contain the current between a pair of opposed electrodes within an electrode set, so that substantially all the current flows between the pair of opposed electrodes and none flows to a separate set of electrodes connected to a different phase combination of the power supply, or to a separate power supply, through an extraneous firing path.

However, where the adjacent electrode groups of separate electrode sets are connected to different phase combinations of a multiphase power supply, the phase difference between the adjacent groups will cause some flow of current between the groups. Such is the case when separate transformers are used, each connected to different phase combinations, or separate supplies are used.

The prior art contains many examples of forehearth heating. Such is shown in U.S. Pat. Nos. 3,326,655, 4,029,488, as well as 3,400,204. Additionally, U.S. Pat. No. 4,029,488 shows underglass forehearth electrodes, as does U.S. Pat. No. 4,118,215.

The prior art also shows U.S. Pat. No. 3,961,126 which teaches an electric furnace for heating molten glass powered from a three phase source, and U.S. Pat. No. 3,985,944 showing a 60° phase angle between adjacent electrodes in an electric furnace. Other prior art patents are U.S. Pat. Nos. 3,098,111, 3,182,112, 2,350,734 and 2,761,890.

However, none of the prior art patents teaches the arrangement of this invention in a forehearth wherein the forehearth is electrically heated by opposed electrode groups disposed along the forehearth and with undesirable cross firing limited between adjacent groups connected to different power supplies and not part of the desired firing path.

SUMMARY OF THE INVENTION

A melting furnace, such as a glass melting furnace for example, has a forehearth for supplying the melted material to an end use device. Typically, in such situations the melted material cools as it flows along the forehearth channel. Where adequate control over the temperature of the material is required, it is necessary to introduce some type of heating in the forehearth.

The forehearth is typically a narrow channel and the problem of arrangement of electrodes within the channel, for heating the material therein, is raised by undesirable cross firing. This cross firing arises where separate groups of opposed electrodes are connected to separate phases of a multiphase power supply and current flows between the adjacent electrode groups due to the phase angle relationships between the adjacent groups. The purpose of this invention is to limit those cross currents within the forehearth so that the majority of current, and substantially all current, flows between a pair of electrodes connected to the same power supply or transformer winding.

This invention accomplishes this result by limiting the phase angle difference between adjacent groups of electrodes to 90° or less and, preferably, to approximately 60° where a three phase power supply having sources separated by 120° is employed.

The electrode groups may each employ at least one or more electrodes and a pair of groups are opposed to form a set of opposed electrodes in the forehearth channel. The electrodes may be arranged across opposite walls of the channel to create a current path through the material as it flows along the channel, the arrangement of the electrodes being a matter preference in selecting a desired heating path.

Whether the opposed electrodes fire across the channel or on the same side of the channel, the electrode groups arranged adjacent to each other are so connected to the multiphase power supply to have a phase difference of 90° or less and, preferably, 60° where a three phase power supply is used.

In this condition, the phase angle difference, which is 90°, limits the instantaneous voltage difference between the applied power to each of the adjacent electrode group, and the current therebetween is thereby minimized.

DESCRIPTION OF THE DRAWINGS

FIG. 1a shows in schematic form a furnace with a forehearth channel, and electrodes arranged in the channel for creating currents across the channel.

FIG. 1b shows a partial plan view of the electrode arrangement in the forehearth shown in FIG. 1.

FIG. 1c shows in achematic form the electrical connection for energizing the electrodes shown in the forehearth of FIG. 1a;

DESCRIPTION OF THE PREFERRED EMBODIMENTS

Figure 1C:
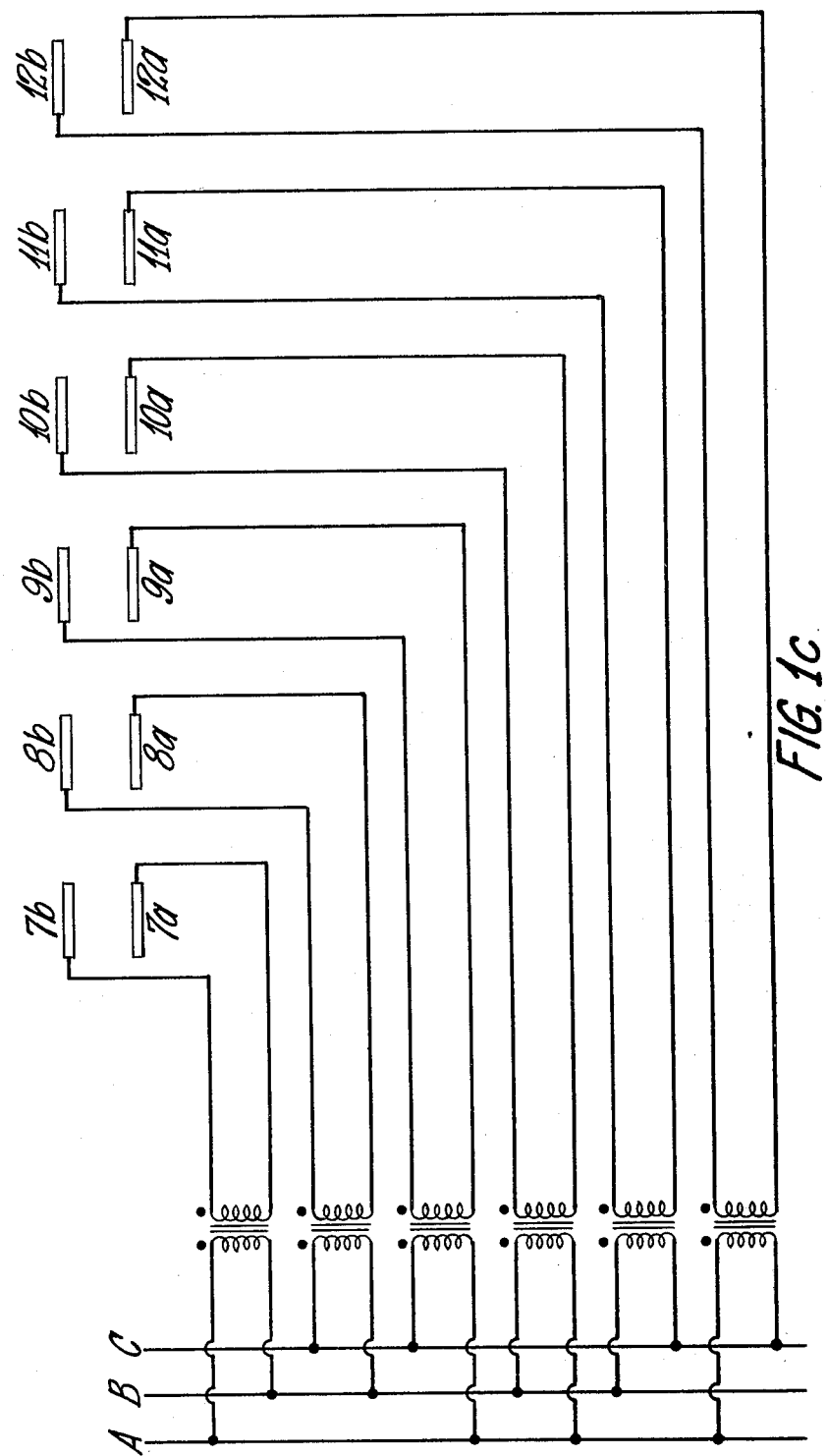

The preferred embodiments for practicing this invention is shown in FIG. 1a, however, it should be understood that any arrangement of electrodes in a forehearth can be connected to a power source according to the principles of this invention, where the connections provide 90° phase angle difference or less between adjacent electrode groups, and where the adjacent electrode groups are connected to different phases of a power supply. According to the principles of this invention, the phase angle difference between adjacent groups of electrodes connected to different phases of a power supply will be minimized, minimizing the interphase current flow between the adjacent groups in the forehearth.

Now referring to FIG. 1a, a first embodiment according to the principles of this invention is illustrated.

The furnace and forehearth are shown generally in FIG. 1a in a cross-sectional view. The furnace is shown generally by numeral 1 having electrodes 3 connected to a power source (not shown) for heating a heat softenable material, such as glass. The furnace need not be an electric melting furnace, an electrical melting furnace being shown by way of an example. The forehearth channel indicated generally by 5 contains a first group of electrodes 7a communicating with a second group of opposed electrodes across the forehearth channel. Additionally, within the forehearth channel is a second group of opposed electrodes 8a-8b and a third group of opposed electrodes 9a-9b, it being understood that the separate groups of electrodes are only limited by the length of the forehearth and the spacing desired between the electrode groups. Each of the separate electrode groups 7a and its associated opposed electrode group 7b, 8a and its associated opposed electrode group 8b, 9a and its associated opposed electrode group 9b, are connected to separate transformers and separate phases of a multiphase power supply. These separate transformers may be thought of as separate power supplies. A top view of the forehearth is shown in FIG. 1b. The center of the forehearth channel is shown by line A—A' and a set of opposed electrodes of a group, such as 7a and 7b are disposed across the center line of the forehearth channel and are arranged to create a firing path between the opposed electrodes 7a and 7b. Similarly, the opposed electrode of electrode group 8a and 8b are shown disposed across the forehearth channel, as are electrode groups 9a and 9b. The arrangement of the electrical connection to the electrode groups in the opposed pairs within each group is shown in FIG. 1c. It should be understood that the arrangement shown in FIG. 1c is not necessarily the arrangement needed to practice this invention; it is only important that the phase relationship between the adjacent electrode groups 7a and 8a, 7b and 8b, 8a and 9a, and 9a and 8b be 90° or less. As shown in FIG. 1c phase AB of the three phase supply shown is connected through a transformer to a first set of opposed electrodes comprising groups 7a and 7b. Similarly, the opposed electrode set comprising groups 8a and 8b are connected to phase CB through a transformer, and electrode groups 9a-9b are connected through a transformer to phase CA. With this arrangement, the phase angle difference between electrodes 7b and 8b is 60°, as is between 8b and 9b, and similarly, the interphase relationship between electrode groups 9a and 8a, and 7a and 8a is 60°.

The glass level may be as shown by line 11 within the forehearth 5, the furnace and the forehearth walls being indicated by numeral 13. The type of firing shown here is known in the art as underglass firing, it being understood that the type of firing chosen to practice this invention is not necessary to achieve the inventive effect. The electrodes may be placed in the side walls or in any other suitable arrangement for introducing the electrodes to the melted material and causing a current to flow from the electrodes to the melted material.

As stated above with regard to the embodiment shown in FIG. 1c, all electrodes shown for each group (7a-7b, 8a-8b, 9a-9b) are connected in parallel to a transformer terminal. Electrode groups 7a and 7b form a set of opposed electrodes connected to one phase of the supply at the output of a transformer or may be connected to a separate supply. Similarly, electrodes of group 8a are connected in parallel, as are the electrodes of group 8b and the set comprising the electrode groups 8a and 8b, are connected across a transformer supply similarly to set 7a-7b. Set 9a-9b are also connected in this manner.

As stated above, the object of the invention is to limit the firing path to predetermined sets of opposed electrode pairs. In the case of FIG. 1b these are (7a-7b), (8a-8b) and (9a-9b).

For the purpose of explaining this invention, the current flowing through a single transformer circuit will be called intraphase and the currents flowing between two or more transformers will be called interphase.

In order to limit the current to the intraphase current paths as discussed above and reduce to a minimum the interphase current, for example, between electrode group 8b and 9b, and 7b and 8b, the electrode groups are connected such that the phase angle difference between those closest adjacent electrodes not connected to the same transformer is 90° or less.

Referring back to FIG. 1b, the closest adjacent electrode groups not connected to the same transformer would be 7a and 8a, 7b and 8b, 8b and 9b, 8a and 9a. As can be seen, the electrodes are connected through separate transformers to a three phase supply with each phase of the supply being separated from another phase of the supply by 120°. The connections shown through the transformers insure that the phase relationship between the closest adjacent electrodes not connected to the same transformer will be 60° minimizing the potential difference therebetween in the interphase firing between two or more transformers.

Within melting furnaces, the forehearth usually serves as a feeder channel and is considerably constricted with regard to the size and displacement of the melting furnace itself. To maintain the proper consistency of the melted product as it flows through the forehearth from the melting furnace to its outlet, the temperature of the melt must be maintained. This can be done conveniently by means of electrical firing and, as in the case of glass shown by way of example here, by underglass electrodes. However, it is desirable to maintain the current between electrodes to a desired path, concentrating electrical energy within that desired path by maintaining a maximum of current from a single power source, such as a single transformer, exclusively within that transformer and through its associated path in the forehearth. The length of the forehearth and the proximity of the electrodes to each other, especially where the electrodes are connected to different transformers, forces special electrode arrangements to insure that a minimum of current flows in an interphase path from one transformer winding to another transformer winding. In the preferred embodiment shown in FIGS. 1a and 1b, adjacent electrodes and adjacent electrode sets are spaced equally apart. When all adjacent electrodes are equally spaced apart, hot spots are not observed and accurate temperature control is achieved.

A manner of achieving the result of maintaining a maximum of intraphase current flowing within the windings of one transformer is by reducing the phase angle difference between electrodes connected to separate transformers. As in the case shown here, within the example of the melting furnace forehearth wherein the melted material temperature is maintained by Joule effect heating, the result is accomplished by maintaining the phase angle difference to 90° or less.

The electrodes in FIGS. 1a, 1b and 1c are shown entering from the side of the forehearth, for the purpose of explanation. It should be understood that other arrangements, such as bottom entering electrodes, can be used and in many cases are preferred, the firing channel across the forehearth being the same as for the electrodes entering from the side of the forehearth. Also, electrodes may be arranged from the top of the forehearth as well as from the bottom.

I claim:

1. A method of heating a molten material flowing in a forehearth of a furnace, said method comprising the steps of: positioning a plurality of sets of opposed electrodes in the forehearth; connecting separate sources of power to each of said sets of electrodes, said separate sources being phase related and connected to produce a phase angle relationship between adjacent electrode sets of not greater than 90°.

2. A method as recited in claim 1, wherein the phase angle relationship between adjacent electrode sets is 90°.

3. A method as recited in claim 1, wherein the phase angle relationship between adjacent electrode sets is 60°.

4. A method as recited in claims 1 or 3, wherein said sets of opposed electrodes are positioned in the forehearth such that adjacent electrodes of each set and adjacent electrodes of adjacent electrode sets are equally spaced.

5. A melting furnace comprising: a melting chamber having means for melting a thermoplastic material; a forehearth channel in communication with said melting chamber; a plurality of electrode sets positioned in said forehearth channel, each of said sets having at least a pair of opposed electrodes; a source of multi-phase electrical power; and means for connecting said source of multi-phase power to said electrode sets to produce a phase angle relationship of not greater than 90° between adjacent electrode sets.

6. A melting furnace as recited in claim 5, wherein the phase angle relationship between adjacent electrode sets is 90°.

7. A melting furnace as recited in claim 5, wherein the phase angle relationship between adjacent electrode sets is 60°.

8. A melting furance as recited in claim 5, wherein said sets of opposed electrodes are positioned on opposite sides of said forehearth channel.

9. A melting furnace as recited in claim 8, wherein said sets of opposed electrodes are positioned such that adjacent electrodes of each set and adjacent electrodes of adjacent electrode sets are equally spaced.

10. A melting furnace as recited in claim 7, wherein said source of multi-phase electrical power is three phase power and said sets of opposed electrodes are positioned on opposite sides of said forehearth channel such that adjacent electrodes of each set and adjacent electrodes of adjacent electrode sets are equally spaced.

11. A melting furnace as recited in claim 7, wherein said sets of opposed electrodes are positioned on opposite sides of said forehearth channel such that adjacent electrodes of each set and adjacent electrodes of adjacent electrode sets are equally spaced and said source of multi-phase electrical power is a three phase power source.

* * * * *

UNITED STATES PATENT AND TRADEMARK OFFICE
CERTIFICATE OF CORRECTION

PATENT NO. : 4,309,567
DATED : January 5, 1982
INVENTOR(S) : Michael Williamson

It is certified that error appears in the above—identified patent and that said Letters Patent is hereby corrected as shown below:

At item 57 (Abstract), line 6, a comma should be inserted after the word "less".

At column 2, line 32, the words "or less" should be inserted after "90°" and before the comma.

At column 3, line 7, the numeral "7b" should be inserted after the word "electrodes".

At column 4, line 25, a comma should be inserted after "60°".

Signed and Sealed this

Sixth Day of April 1982

[SEAL]

Attest:

Attesting Officer

GERALD J. MOSSINGHOFF

Commissioner of Patents and Trademarks